United States Patent Office 3,024,116
Patented Mar. 6, 1962

3,024,116
FOOD PROCESSING
George C. Engelland, Blue Island, Ill., assignor to Libby, McNeill and Libby, Chicago, Ill., a corporation of Illinois
No Drawing. Filed Feb. 24, 1959, Ser. No. 794,860
6 Claims. (Cl. 99—156)

This invention relates to an improved method for producing sauerkraut.

The production of sauerkraut, as carried out by present day techniques, is a time-consuming, costly operation fraught with difficulties which stem from carrying out of a lengthy part of the process, namely the fermentation, in open tanks, with resultant high maintenance and handling costs, supervision of the progress of the fermentation of the product in the open tanks, and possibilities of insect, or other forms of product contamination, spoilage losses, and the like.

Thus, by way of illustration of a typical commercial operation, cabbage is brought by truck to the plant by the growers, is inspected for quality and is then unloaded into storage bins, sufficient cabbage being stored in the bins so that the plant operations can be maintained, most preferably, on a continuous basis throughout the day. The cabbage is drawn from the bins as needed and is conveyed to the coring and the trimming operations, where the core of the cabbage is removed and the outer leaves cut off. The cored, trimmed cabbage is then transferred to shredding machines where it is cut into thin shreds.

The shredded cabbage then drops from the shredding machines into buggies, is trucked to tanks, dumped in, and salted down. This procedure is followed until the tank has been filled with the required weight of cut cabbage, after which the tank is covered. During the process of "salting" juice is drawn from the cabbage by the osmotic action of the salt.

Fermentation is then allowed to proceed, without further treatment of the cabbage, until the acid level of the sauerkraut reaches a point high enough to produce a 1.0% minimum acidity in the final canned product. During the canning of sauerkraut, plain brine and/or kraut juice is used as the additive, and the kraut must therefore be fermented to 1.6% acidity, or higher, in order to meet the minimum acidity requirements in the final canned product. Ordinarily weeks and even months, of fermentation in the tanks is necessary in order to obtain 1.6% acidity, the tanks, during this time, requiring constant care and attention in order to maintain the product in as good condition as possible.

When the acidity, as an incident of fermentation, has reached the desired point, the sauerkraut is ready for canning. The cover is removed from the fermentation tank, the kraut examined for quality, and any off-quality product removed and dumped. The kraut is then pitched into buggies and transferred to packing tables, where it is packed into cans, the cans of kraut being then filled with hot, plain salt brine and/or kraut juice adjusted to produce about 2% salt in the finished product. The filled cans then pass though a chamber where the temperature of the canned product is raised to a point high enough, and for a sufficient period of time, to remove air and obtain pasteurization of the kraut. The filled cans are then closed by machine in the usual manner, the canned hot kraut transferred to an area where the cans are stacked for cooling; after cooling the cans are labeled, cased and stored until required for shipment.

Kraut juice, which remains after the kraut is canned, if not used in canning kraut, is either canned as a separate item—if desired—or destroyed; in either case it is a factor in calculating the yield of kraut from a given weight of cabbage and brine.

The method of the instant invention is an improvement over the foregoing age-old technique of producing sauerkraut and is simpler, requires less capital investment by eliminating the need for tanks, buildings to house the tanks, building maintenance costs, and the like, is more flexible in its operation since it permits packing of the product anywhere that cabbage can be grown, and results in a more uniform product.

Such undesirable products as soft kraut, dark kraut and pink kraut, which result from the non-uniform salting of cabbage during filling of the tank and by excessive aeration, which permits development of undesirable organisms (that cause or contribute to the development of these conditions), are eliminated by the applicant's process.

Also eliminated is "spoiled kraut," a product resulting from conditions present at the surface of the kraut in the tanks, where there is an abundant supply of air, where the salt and acid contents are usually lowest, and where putrefactive bacteria, yeasts and molds causing the spoilage can grow.

In accordance with the applicant's invention, and by way of illustrating a detailed embodiment of the process comprising the invention, shredded cabbage was placed in containers conveniently of 300 x 407-can size. Approximately 1 fluid ounce of brine, made up to about 2% salt and preferably containing about 0.2% acid as vinegar, was added to each container. The purpose of the acid was to lower the pH of the can contents to the point where undesirable microorganisms will not thrive, in case of accidental contamination.

The containers then passed through a steam box, where the temperature of the contents was raised to a point high enough, and maintained there long enough, to obtain sterilization, or at least pasteurization, of the container contents. From the steam box the containers then passed on to a briner, where they were filled with sterilized cold brine, to which an inoculum of a homofermentative, i.e. a non-gas forming, lactic acid producing organism had been added. Understandably combinations of such organisms may be employed. Alternatively the inoculum may be added after brining the cans.

Any media suitable for culturing these types of organisms may be used. One such inoculum was produced as follows: An aqueous broth was made up containing the following components in the indicated proportions:

| | Percent |
|---|---|
| Yeast extract | 1 |
| Tryptone | 0.1 |
| Di-potassium phosphate | 0.1 |
| Sucrose | 2.5 |
| Sodium chloride | 2 |

Two thousand cubic centimeters of the above broth was sterilized by conventional techniques. There was then added to the broth a culture of *Lactobacillus plantarum*, and the broth incubated at around 90° F. until a substatnial number of organisms were produced. The incubation time and temperature are not particularly critical, as those skilled in the art will appreciate, goodly numbers of bacteria being produced in the inoculum when incubated for from 24 to 48 hours at temperatures which may be, for example, from about 80° to 115° F. Other inocula were produced in the foregoing way, using as the organism, *Lactobacillus casei, Lactobacillus acidophilus, Lactobacillus lactis,* and *Lactobacillus delbruckii.*

The amount of the foregoing inoculum of *Lactobacillus plantarum*, which was added to the mixture of brine and cabbage, was such that 2,000 cc. of the inoculum inoculated 4 gallons of brine.

The filled containers, now containing the pasteurized mixture of shredded cabbage and brine, as well as the inoculum, were then immediately closed hermetically, with conventional machinery, cooled, labeled, cased, and stored at ambient temperatures to permit the fermentation to proceed within the closed containers. When the acidity resulting from fermentation caused by the organism in the inoculum reached the desired point, namely a minimum of 1% calculated as lactic acid, the product was ready to be made available to the consumer. Fermentation will, of course, continue in the container until the maximum amount of acid has been produced, which depends, other things being equal, on the amount of fermentable sugars initially present in the cabbage, on the acid-producing capabilities of the selected organisms, or both. At storage temperatures of 70° F. to 85° F. it generally requires about 7 days to reach a minimum of 1% lactic acid.

The practice of the present invention not only results in the more economical production of a better, more uniform product than heretofore obtained by the practice of conventional procedures in sauerkraut production, but substantially eliminates the tank operations, with their maintenance costs, difficulties in maintaining sanitation and freedom from insect infestation and spoilage, and space requirements.

Besides the advantages already mentioned, the present process results in increased yields of sauerkraut. For example, the present process has resulted in a recovery of 50 cases of 2½-size cans of kraut per ton, as against 30 cases per ton by the presently-used methods of tank-curing the product, the resulting increase in recovery by the applicant's process being due to the elimination of kraut juice and of minimization of shrinkage losses in the tanking operations.

I claim:

1. A method of producing sauerkraut which comprises placing shredded cabbage and brine in a hermetically sealable container, exposing the container to a temperature and for a time sufficient to at least result in pasteurization of the product, filling the said container with sterilized cold brine containing an inoculum of at least one species of non-gas forming lactic acid producing organism, hermetically sealing the said container and storing the container until fermentation therein proceeds to the point wherein at least 1% lactic acid has been produced.

2. A method of producing sauerkraut which comprises placing shredded cabbage and brine in a container in which the sauerkraut will be marketed, exposing the container to a temperature and for a time sufficient to at least result in pasteurization of the product, filling the said container with sterilized cold brine containing an inoculum of at least one species of non-gas forming lactic acid producing organism and sufficient edible acid to inhibit growth of undesirable microorganisms, and hermetically sealing the said container and storing the container until fermentation therein proceeds to the point wherein at least 1% lactic acid has been produced.

3. A method of producing sauerkraut which comprises placing shredded cabbage and brine in a hermetically sealable container, exposing the container to a temperature and for a time sufficient to at least result in pasteurization of the product, substantially filling the said container with sterilized cold brine, adding to said container contents an inoculum of at least one species of non-gas forming lactic acid producing organism, hermetically sealing the said container and storing the container until fermentation therein proceeds to the point wherein at least 1% lactic acid has been produced.

4. A method of producing sauerkraut which comprises placing shredded cabbage and brine in a hermetically sealable container, exposing the container to a temperature and for a time sufficient to at least result in pasteurization of the product, substantially filling the said container with sterilized cold brine, adding to said container contents an inoculum of *Lactobacillus plantarum*, hermetically sealing the said container and storing the container until fermentation therein proceeds to the point wherein at least 1% lactic acid has been produced.

5. A method of producing sauerkraut which comprises placing shredded cabbage and brine in a hermetically sealable container, exposing the container to a temperature and for a time sufficient to at least result in pasteurization of the product, substantially filling the said container with sterilized cold brine, adding to said container contents an inocullum of a microorganism selected from the group *Lactobacillus casei, Lactobacillus plantarum, Lactobacillus acidophilus, Lactobacillus lactis,* and *Lactobacillus delbruckii,* and mixtures thereof, hermetically sealing the said container and storing the container until fermentation therein proceeds to the point wherein at least 1% lactic acid has been produced.

6. A method of producing sauerkraut which comprises placing shredded cabbage, brine, and up to about 0.2% based on the brine of acid as vinegar, in a container, exposing the container contents to a temperature and for a time sufficient to at least result in pasteurization of the container contents, then adding to the container contents sterilized cold brine and an inoculum of at least one species of non-gas forming lactic-acid producing organism, hermetically sealing the said container and storing the container at ambient temperature until fermentation therein proceeds to the point wherein at least 1% lactic acid has been produced.

References Cited in the file of this patent

UNITED STATES PATENTS

| | | |
|---|---|---|
| 2,143,358 | Walsh et al. | Jan. 10, 1939 |
| 2,345,814 | Harrison | Apr. 4, 1944 |
| 2,476,412 | Harris | July 19, 1949 |

OTHER REFERENCES

Industrial Fermentations, Allen, published by The Chemical Catalog Co., Inc., 1926, pp. 230–232.

Food and Food Products, Jacobs, 2nd Edition, vol. III, Interscience Publishers, Inc., 1951, pp. 1910–1914.

UNITED STATES PATENT OFFICE
CERTIFICATE OF CORRECTION

Patent No. 3,024,116                      March 6, 1962

George C. Engelland

It is hereby certified that error appears in the above numbered patent requiring correction and that the said Letters Patent should read as corrected below.

In the grant, lines 2 and 3, for "Libby, McNeill and Libby, of Chicago, Illinois, a corporation of Illinois" read -- Libby, McNeill & Libby, of Chicago, Illinois, a corporation of Maine --; line 12, for "Libby, McNeill and Libby, its successors" read -- Libby, McNeill & Libby, its successors --; in the heading to the printed specification, line 3 to 5, for "Libby, McNeill and Libby, Chicago, Ill., a corporation of Illinois" read -- Libby, McNeill & Libby, Chicago, Ill., a corporation of Maine --.

Signed and sealed this 20th day of November 1962.

(SEAL)
Attest:
ERNEST W. SWIDER
Attesting Officer

DAVID L. LADD
Commissioner of Patents